United States Patent [19]

Panster et al.

[11] Patent Number: 5,093,451
[45] Date of Patent: * Mar. 3, 1992

[54] FORMED ORGANOSILOXANE AMINE COPOLYCONDENSATES METHOD OF THEIR PREPARATION AND USE

[75] Inventors: Peter Panster, Rodenbach; Stefan Wieland, Offenbach, both of Fed. Rep. of Germany

[73] Assignee: Degussa Aktiengesellschaft, Frankfurt, Fed. Rep. of Germany

[*] Notice: The portion of the term of this patent subsequent to Mar. 12, 2008 has been disclaimed.

[21] Appl. No.: 556,720

[22] Filed: Jul. 25, 1990

[30] Foreign Application Priority Data

Jul. 31, 1989 [DE] Fed. Rep. of Germany ....... 3925360

[51] Int. Cl.$^5$ .............................................. C08G 79/00
[52] U.S. Cl. .................................... 528/9; 528/38; 528/39; 528/30; 528/12; 528/18; 528/21
[58] Field of Search ................... 528/38, 39, 30, 9, 12, 528/18, 21

[56] References Cited

U.S. PATENT DOCUMENTS

| | | |
|---|---|---|
| 4,954,599 | 9/1990 | Panster et al. ................. 528/38 |
| 4,999,413 | 3/1990 | Panster et al. ................. 528/32 |

Primary Examiner—Melvyn I. Marquis
Assistant Examiner—Margaret W. Glass
Attorney, Agent, or Firm—Beveridge, DeGrandi & Weilacher

[57] ABSTRACT

Organosiloxane copolycondensates which are optionally cross-linked by means of cross-linking agents containing Si, Ti, Zr and/or Al and comprised of the units

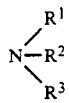

and X—R$^4$, wherein

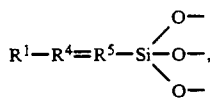

wherein R$^5$ = alkylene with C$_1$–C$_{10}$ bound directly to N or X, or cycloalkylene with C$_5$–C$_8$ or

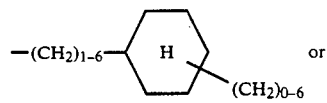

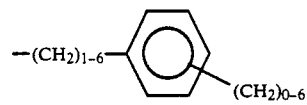

X = —NH$_2$, —NH—(CH$_2$)$_2$—NH$_2$, —N(CH$_3$)$_2$, —N(C$_2$H$_5$)$_2$ —NH—(CH$_2$)$_2$—NH—(CH$_2$)$_2$—NH$_2$, —Cl, —Br, —I, —SH, —P(C$_6$H$_5$)$_2$,

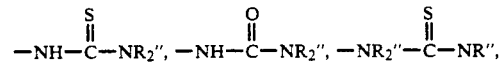

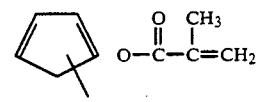

wherein R″ = H or alkyl with C1–C5 in the form of spherical particles with a diameter of 0.01 to 3.0 mm, a specific surface of up to 1000 m$^2$/g, a specific pore volume of up to 6.0 ml/g and a bulk density of 50 to 1000 g/l. The formed copolycondensates can be used for removing metals from solutions and/or for the adsorption of gaseous organic compounds and/or of water vapor.

24 Claims, No Drawings

FORMED ORGANOSILOXANE AMINE COPOLYCONDENSATES METHOD OF THEIR PREPARATION AND USE

INTRODUCTION AND BACKGROUND

The subject matter of the present invention relates to macroscopic sperically formed copolycondensates of a tertiary organosiloxane amine with one or more siloxane components which exhibit engineering and application-technology advantages over previously developed organopolysiloxane copolycondensates (German patent application P 38 37 416). In a further aspect, the present invention relates to methods according to which the new products can be manufactured not only in the sphere size ideal for the particular application but also with the suitable physical qualities. In addition, methods of using these spherically formed organosiloxane amine copolycondensates are described.

The insoluble organosiloxane amines described in German patent 31 20 214, which are distinguished by especially advantageous chemical and physical properties, are already known. These organosiloxane amines can be used as ion exchangers, adsorbents, active-substance carriers, as catalytic carriers or as a stable base in base-catalyzed reactions. The matrix of these polymers can be modified chemically and physically in an ideal manner and thus be adapted to the requirements of the various applications.

A method of forming these new polymers into sperical particles was developed which makes it possible to prepare these products in the particularly advantageous form. These formed organosiloxane amines are described in German patent application P 38 00 563.8 now U.S. Pat. No. 4,954,599.

After it proved to be advantageous in various applications of the organosiloxanes to combine several groups with different functions in one polymer matrix with each other, appropriate organosiloxane amine copolycondensates were developed and described in German patent application P 38 37 416.1 corresponding to U.S. patent application Ser. No. 07/431,220. The different variants of the arrangement of the different functionalities in the polymeric union, optionally in combination with cross-linking agents, create additional possibilities. However, in the meantime the methods for making these copolycondensates proved to be unfavorable beacuse the products were able to be produced only in a relatively undefined geometric form and not in a spherical form with the desired physical and morphological qualities.

SUMMARY OF THE INVENTION

An object of the present invention is to make available in a reproducible manner the organosiloxane amine copolycondensates of the type described in German patent application P 38 37 416.1 in spherical form and with the desired physical qualities.

A feature of the present invention resides in the macroscopic spherical formed organosiloxane amine copolycondensates comprising units of the formula

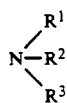  (I)

and of units of the formula $$X-R^4 \quad (II)$$

wherein $R^1$ to $R^4$ are identical or different and signify a group of the formula

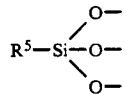  (III)

wherein $R^5$ is bound directly to the nitrogen atom or the single-bonded group and represents a linear or branched alkylene group with 1 to 10 C atoms, a cycloalkylene group with 5 to 8 C atoms or a unit of the general formula

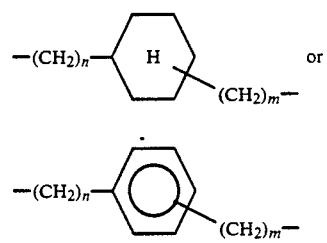

in which n is a number from 1 to 6 and indicates the number of methylene groups bonded to nitrogen or to X and m is a number from 0 to 6,
wherein the free valences of the oxygen atoms bound to the silicon atom are saturated as in silica skeletons by silicon atoms of further groups of formula (III) and/or via the metal atoms in one or more of the cross-linking bridge-type cross-links

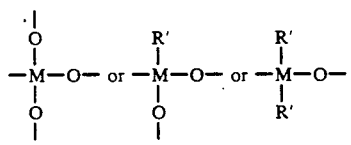

or

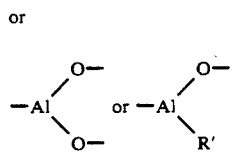  (IV)

wherein M is a silicon, titanium or zirconium atom and R' a linear or branched alkyl group with 1 to 5 C atoms or a phenyl group and the ratio of silicon atoms from the groups of the formula (III) to the metal atoms in the bridge-type cross-links (IV) is 1:0 to 1:20 and X stands in formula (II) for —NH₂, —N(CH₃)₂, —N(C₂H₅)₂, —NH—(CH₂)₂—NH₂, —NH—(CH₂)₂—NH—(CH₂)₂—NH₂, —Cl, —Br, —I, —SH, —P(C₆H₅)₂, —CN,

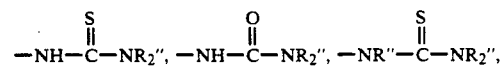

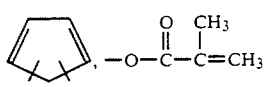

In the above, R″ is identical to H or is a linear or branched alkyl group with 1 to 5 C atoms or a group $(CH_2)_n-NR_2'''$, wherein n signifies a number from 1 to 6 and R‴ has the same meaning as R″.

The macroscopic spherical particles have a diameter of 0.01 to 3.0, preferably 0.1 to 2.0 mm, a specific surface of up to 1000, preferably up to 700 m²/g, a specific pore volume of up to 6.0 ml/g as well as a bulk density of 50 to 1000 g/l, preferably 100 to 800 g/l.

In a more detailed aspect the formed organosiloxane copolycondensates have a ratio of units according to formula (I) to units according to formula (III) which ranges from 0.03:99.97 to 99.99:0.01, preferably 5:95 to 95:5.

The formed organosiloxane copolycondensates can be present as so-called random copolycondensates, block copolycondensates or as mixed copolycondensates.

In the above formula, it is preferred that $R^1$ to $R^4$ stand for a group of the formula

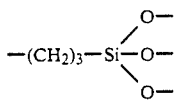

The ratio of the two components according to formula I and formula II can vary greatly and can be within the limits indicated in above without causing problems for the morphological, physical or chemical qualities of the products of the invention or for the method of production of the invention.

The ratio of monomers to be selected in practice depends primarily on the intended use of the particular copolycondensate and on the chemical and physical qualities required for this use, that is, e.g. on whether a high density of functional groups according to formula II is desired or not.

The monomeric structural elements of the formed organosiloxane amine copolycondensates are, in principle, known compounds, e.g. of the formulas N[(CH₂)₃Si(OC₂H₅)₃]₃
H₂N—(CH₂)₅Si(OCH₃)₃
H₂N—(CH₂)₂—NH—(CH₂)₂—NH—(CH₂)₃Si(OCH₃)₃
(C₆H₅)₂P—(CH₂)₂Si(OCH₃)₃

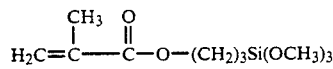

Si(OC₂H₅)₄
(N,N′-disubstituted and N,N,N′-/N,N′,N′-trisubstituted organyloxysilyl-functional thioureas which exhibit a tertiary amine function in addition are described in German patent application P39 25 356.2, of July 31, 1989, filed in parallel as regards substance and possibilities of preparation.

The composition of the polymer units obtainable therefrom can be described by the formulas N[(CH₂)₃SiO₃/₂]₃
H₂N—(CH₂)₅SiO₃/₂
H₂N—(CH₂)₂—NH—(CH₂)₂—NH—(CH₂)₃SiO₃/₂
(C₆H₅)₂P—(CH₂)₂SiO₃/₂

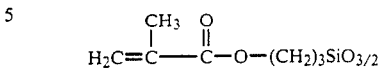

SiO₄/₂ (SiO₂)

The formed copolycondensates can be present even in the case of the identical chemical composition in totally different form as so-called random copolycondensate, or as a block copolycondensate.

According to the invention, the formed copolycondensates can be present in each of the three named forms when practicing the forming methods of the invention as concerns the units according to formulas I, II and IV. This means that in the case of a pure random copolycondensate containing units according to formulas I and II and optionally also units according to formula IV, a purely random distribution of the components is given in accordance with the molar ratios of the initial products, taking into consideration the silicon groupings according to formula III present in the case of the units according to formulas I and II and considering the functionality of the grouping of cross-linking agents according to formula IV. In the case of a so-called block copolycondensate, there is a building of blocks of the same units according to formulas I and II and optionally IV. Finally, a so-called mixed copolycondensate exhibits both structures of a random copolycondensate and also of a block copolycondensate. The units according to formula I or II or IV can be present both as random as well as block copolycondensate.

According to a further aspect of the invention, there are provided methods for preparing the copolycondensates of the invention. A method according to which random copolycondensates can be obtained in spherical form comprises dissolving in a solvent a tertiary aminoorganosilane of the general formula

 (V)

together with an organofunctional silane $$X-R^9 \qquad (VI)$$

corresponding to the desired stoichiometric composition of the copolycondensate to be prepared. That is an amount of silane is chosen so as to be sufficient to produce the desired product. $R^6$ to $R^9$ are identical or different and signify a group of the formula $$R^5-Si(OR^{10})_3 \qquad (VII)$$

$R^5$ has the same meaning as in formula (III), $R^{10}$ signifies a linear or branched alkyl group with 1 to 5 C atoms and X has the same meaning as in formula (II), optionally after the addition of one or more cross-linking agents of the general formula $$M(OR)_{2-4} R'_{0-2} \text{ or } Al(OR)_{2-3} R'_{0-1} \qquad (VIII)$$

wherein M is a silicon, titanium, zirconium atom, R′ a linear or branched alkyl group with 1 to 5 C atoms or a phenyl group and R signifies a linear or branched alkyl group with 1 to 5 C atoms. The ratio of silicon atoms from the groups of the formula (VII) to the metal atoms in the bridge-type cross links is 1:0 to 1:20, The solvent is largely water-miscible but is capable of dissolving aminoorganosilanes according to formula (V) and organofunctional silanes according to formula (VI) as well as cross-linking agents according to formula (VIII).

An amount of water is added to the resulting solution under agitation which amount is at least sufficient for the complete hydrolysis and condensation.

The resulting reaction mixture is allowed to gel under further agitation at a certain temperature in a range from room temperature to 200° C. The reaction mixture is compounded at the start of gelling or up to one hour thereafter with 10 to 2000, preferably 50 to 500% by weight of a solvent, relative to the total amount of aminoorganosilane (V), organofunctional silane (VI) and, optionally, cross-linking agents (VIII). The solvent is largely water-insoluble but is capable of dissolving the reaction mixture which has gelled or started to gel. It is then homogenized. Water, in the amount of 10 to 2000, preferably 50 to 500% by weight, relative to the total amount of aminoorganosilane (V), organofunctional silane (VI) and, optionally, cross-linking agents (VIII), is added to the viscous homogenizate immediately or within a time frame of up to 3 hours, optionally under elevation of the originally set temperature. The organic phase, which now contains siloxane, is dispersed in the liquid two-phase system and the solid which forms in the shape of spheres is separated from the liquid phase after a reaction time sufficient for this purpose at room temperature to 200° C. The resulting spherical particulate product is then optionally extracted, dried at room temperature to 250° C., optionally under protective gas or in a vacuum and tempered 1 to 100 hours at temperatures from 150° C. to 300° C. The product is optionally subjected to classification by size.

In principle, instead of the alkoxysilylamine compounds, the corresponding halogenide compounds or phenoxy compounds can also be used as initial material for the method; however, their use offers no advantages but instead, for example in the case of the chlorides, can cause problems due to the hydrochloric acid released during the hydrolysis.

The hydrolysis of initial material and optionally of cross-linking agents must be carried out in a solvent which is largely water-miscible but dissolves the initial materials. Preferably, alcohols are used which correspond to the alkoxy groupings on the monomeric precursors of the initial materials or on the metal atoms of the optionally used cross-linking agents. The lower alkanols; i.e. methanol, ethanol-, n- and i-propanol, n- and i-butanol or n-pentanol are especially suitable. Mixtures of such alcohols can also be used as solvent in the hydrolysis. Instead of alcohols, other polar solvents which are largely water-miscible can also be used; however, this turns out not to be very logical for engineering reasons on account of the solvent mixture which arises with the alcohol being split off hydrolytically.

The hydrolysis is preferably carried out with an excess of water over the amount stoichiometrically required. The amount of water necessary for hydrolysis depends on the hydrolysis speed of the particular aminorganosilane used or on the cross-linking agent in such a manner that as the amount of water increases, a more rapid hydrolysis occurs; however, an upper limit can be set by separation which occurs and by the formation of a two-phase system. A hydrolysis in homogenous solution is basically preferred. Due to these two aspects described, somewhat less water is used in practice according to weight than organosilanes plus cross-linking agents.

The duration of the hydrolysis is a function of the tendency to hydrolyze of the initial material and/or of cross-linking agents and of the temperature. The readiness to hydrolyze and therewith the hydrolysis speed depends in particular on the type of alkoxy groups bonded to silicon or titanium, zirconium or aluminum, whereby the methoxy group hydrolyzes most rapidly and a deceleration of the reaction occurs with increasing chain length of the hydrocarbon group. In addition, the duration of the entire hydrolysis and polycondensation reaction also depends on the basicity of the aminoorganosilane. Hydrolysis and polycondensation can therefore be accelerated by the addition of other bases, preferably of ammonia or of inorganic or organic acids, but also of customary condensation catalysts such as dibutyl tin diacetate.

The requirement of maintaining the initial material dissolved in solvent and compounded with water at a certain temperature under further agitation therefore results in the fact that the speed of the polycondensation, which displays itself by gelling, is temperature-dependent.

The temperature to be used in the hydrolysis or gelling phase is determined empirically in the individual instance. Care is taken thereby that a jelly-like mass free of solids and permeated with liquid remains preserved for the following next method step, the so-called particle forming phase.

The forming phase occurs with the conversion of the coherent, liquid-permeated, jelly-like mass (in which the condensation reaction proceeds further) into separate spherical particles and begins with the compounding of the reaction mixture, which has gelled or started to gel, with a solvent in the provided amount. The solvent is largely water-insoluble but dissolves the reaction mixture to a sufficient extent.

Suitable solvents are e.g. linear or branched alcohols with 4 to 18 C atoms or phenol, linear or branched symmetric or asymmetric dialkyl ethers as well as di- or triethers (such as ethylene glycol dimethylether), chlorinated or fluorinated hydrocarbons, aromatics or aromatic mixtures substituted with one or more alkoxy groups such as e.g. toluene or xylene, symmetric or asymmetric ketones which are largely not miscible with water.

Preferably, however, a linear or branched alcohol with 4 to 12 C atoms, toluene or o-, m-, p-xylene is added individually or in a mixture to the reaction mixture which has gelled or started to gel.

This addition of solvent brings about a dilution after the homogenization with the reaction mixture and therewith a distinct deceleration or slowing down of the condensation reaction occurring with the increase in viscosity.

The measuring of the amount of this solvent used in the forming phase depends in particular on what particle size is desired for the formed organosiloxane amine compound. The following can be used as a rule of thumb: Little solvent should be used for coarse particles (spheres with a rather large diameter) and a lot of solvent for fine particles (spheres with a rather small diameter).

Moreover, the intensity with which the viscous homogenizate consisting of reaction mixture and largely water-insoluble solvent is dispersed in the additional water added in the forming phase as dispersing agent also influences the particle size. Vigorous agitation regularly favors the formation of a rather fine particle. In order to stabilize the aqueous dispersion of the organic phase (not containing siloxane), one of the known auxiliary dispersing agents such as long-chain carboxylic acids or their salts or polyalkylene glycols can be used in customary concentrations.

According to a variant of the method of the invention, a part or the entire amount of the largely water-insoluble solvent to be added during or after the start of gelling is added in the hydrolysis stage along with the solvent used there. In the case of partial addition, the remainder is added after the start of gelling.

In the extreme case of the addition of the entire amount, the dispersing agent, water, can be added during or after the start of gelling. This variant is used with preference if the added organosilane mixture and optionally cross-linking agent mixture added exhibits an extremely high tendency toward hydrolysis and polycondensation.

The preferred temperature at which the dispersing of the siloxane-containing organic phase in the aqueous phase is carried out and spherical solid is formed from the disperse phase is as a rule the reflux temperature of the entire mixture. However, the same temperatures as in the gelling stage can basically be used. The total duration of dispersing stage and postreaction is as a rule 0.5 to 10 hours.

Both the gelling and the particle forming steps can be carried out at normal pressure or at a superpressure corresponding to the sum of the partial pressures of the components of the reaction mixture at the particular temperature used.

In the preparation of the spherically formed, cross-linked or non-cross-linked organosiloxane amine copolycondensates of the invention, there may arise the situation that one or more components of the mixture to be gelled exhibit a different hydrolysis behavior and polycondensation behavior than the other components. Therefore, in accordance with another variation of the method of the invention the cross-linking agent or agents VIII and/or the functional organosilane VI are not subjected to the gelling together with the aminoorganosilane V but instead the aminoorganosilane V, optionally together with the cross-linking agent VIII or the organosilane VI, is first gelled separately, homogenized with the largely water-insoluble solvent and only then is the cross-linking agent or agents or the organosilane added to the homogenizate.

However, the solvent and the yet to be added silane component can also be added to the gelled aminoorganosilane and optional cross-linking agent or organosilane at the same time.

The separation of the spherically formed, moist product from the liquid dispersing agent can take place by means of conventional techniques such as decanting, filtering or centrifuging. Within the framework of further working up or finishing of the prevalent, the moist solid can be treated once or several times with a low-boiling extraction agent, preferably a low-boiling alcohol. This is carried out in order to facilitate the later drying of the formed particulate material by means of an at least partial exchange of the usually relatively high-boiling solvent of the forming phase with the low-boiling extraction agent.

The drying can basically be carried out at room temperature up to 250° C., optionally under protective gas or in a vacuum. The dried, formed solid can be tempered at temperatures of 150° to 300° C. for hardening and stabilizing.

The dried and/or tempered product can be classified according to size in conventional devices into different particle size fractions. The one or the other of the finishing operations of extraction, drying, tempering and classifying can be eliminated, depending on the circumstances. A classification can be carried out with liquid-moist, dried or tempered product.

In order to compensate for a different hydrolysis behavior and polycondensation behavior of the monomeric components of a random, optionally cross-linked copolycondensate, the present invention provides for a further production variant. In this additional variation, the monomeric components according to formulas V and VI and the optionally present cross-linking agent or agents according to formula VIII can be precondensed at first. To this end, the aminosilane according to formula V, the monomeric component according to formula VI and the cross-linking agent or agents according to formula VIII are precondensed without solvent or using a solvent which dissolves the monomeric component, preferably using an alcohol with 1 to 5 C atoms corresponding to the alkoxy groups. The process is carried out in the presence of an amount of water not sufficient for total hydrolysis, preferably from 1 to 100 mole % of the amount required for this, over a time period of 5 minutes up to 48 hours at room temperature to 200° C. In order to favor this precondensation effect, yet another condensation catalyst such as e.g. an inorganic or organic acid or base or a metal-containing condensation catalyst such as e.g. dibutyl tin diacetate can be added in addition to the aminoorganosilane present. Ammonia is preferably used. After precondensation is completed, the entire hydrolysis and polycondensation are carried out as described/previously.

According to another method variant of the invention, so-called block copolycondensates are obtained in which there is a formation of blocks of identical units according to formulas I and II and optionally of one or more units according to formula IV. This method is carried out by first precondensing independently of such other a tertiary aminoorganosilane of the formula (V) and an organofunctional silane of the formula (VI), wherein $R^6$ to $R^9$ as well as X have the range of meanings previously given. Optionally one or more cross-linking agents of the formula (VIII) are added. The precondensation reaction take place over a period of 5 min. to 48 hours with or without a solvent in the presence of an amount of water which is not sufficient for complete hydrolysis, preferably in the presence of 1 to 100 mole % of the amount required for this purpose. Reaction temperatures range from room temperature to 200° C. Subsequently the precondensed silanes are combined and then, after the addition of more water and, optionally, more solvent so that at least the amount of water stoichiometrically required for a complete hydrolysis and polycondensation is present, the complete hydrolysis and polycondensation are carried out as previously described.

This precondensation described immediately above can likewise be accelerated by the addition of a slight amount of an acidic or base condensation catalyst or also of a metal-containing condensation catalyst. Ammonia is preferably used.

The amount of water used for precondensation depends on which degree of oligomerization, that is, which block size, is to be achieved. If more water is used for the precondensation, it will naturally happen that larger units are produced than if less water is used. The duration of precondensation generally depends, as already described above, on the readiness to hydrolyze of the monomeric component and of the temperature.

According to a still further method variant of the invention, so-called mixed copolycondensates are obtained in which there is in part a formation of blocks of identical units according to formula I and/or formula II and/or of one or more units according to formula IV in which, however, at least one monomeric component is always not precondensed and at least one monomeric component is precondensed. This method is carried out by precondensing independently of each other at least one of the monomeric components provided according to formulas (V), (VI) and (VIII) for 5 min. to 48 hours, with or without a solvent in the presence of an amount of water which is not sufficient for the complete hydrolysis, preferably in the presence of 1 to 100 mole % of the amount required for this purpose. Reaction temperatures range from room temperature to 200° C. The resulting precondensate is then combined with the non-precondensed monomer or monomers and finally, after the addition of more water and, optionally, more solvent, the complete hydrolysis and polycondensation are carried out according to the procedure described previously.

Thus, this variation provides that from the provided monomers of the general formulas V, VI and optionally VIII, at least one monomer or several monomers are precondensed independently of each other, as described above, and subsequently united with the remaining, non-precondensed monomer or monomers. Then, after the addition of more water as well as, optionally, more organic solvent, the complete hydrolysis and polycondensation of the entire mixture is completed. The further treatment of the polycondensate formed thereby follows the other methods described above.

An especially important embodiment of the method of the invention provides that the spherical particulate material which is still moist or wet with organic solvent and with water is subjected to a temperature treatment for 1 hour to one week at temperatures from 50° to 300° C., preferably 100° to 200° C., wherein excess pressure can be used as needed.

This treatment under "steaming" or digesting conditions likewise serves primarily for an improvement of the mechanical strength and of the porosity of the formed material and can also be carried out in the dispersion of the production method which is present at the end and contains a liquid product phase and the solid product phase or can be carried out in water alone.

The above-described embodiment of a posttreatment of the formed organosiloxane copolycondensates which were obtained but not dried therefore resides in the fact that the solid shaped in the form of spheres is subjected to a temperature treatment in the presence of at least the water or the liquid phase which is present at the end in the production method either as vapor or liquid, for 1 hour up to one week at temperatures of 50° to 300° C., preferably 100° to 200° C., optionally under excess pressure. The presence of an acidic, basic or metal-containing catalyst can be advantageous in this aspect of the invention. An especially advantageous embodiment provides for the use of ammonia.

The new, macroscopic spherically formed organosiloxane amine copolycondensates are characterized in particular by the quantitative hydrolysis yields, the elementary analyses and by the the determination of the individual functionalities. Purely optically speaking, there is no difference between the copolycondensates obtained in accordance with the different production methods. Depending on the pretreatment, the spherically formed copolycondensates of the invention exhibit a particle diameter of 0.01 to 3.0 mm, preferably 0.05 to 2.0 mm, a specific surface of up to 1000 $m^2/g$, preferably up to 700 $m^2/g$, a specific pore volume of up to 6.0 ml/g and a bulk density of 50 to 1000 g/l, preferably 100 to 800 g/l. The adjustable pore diameters are in a range of 0 to over 1000 nm.

The chemical stability of the formed products is comparable to those of the unformed products, that is, they are distinctly above 150° C. in air and above 200° C. under an atmosphere of protective gas, depending on the individual functionalities.

In addition to the general applicability of the formed copolycondensates as active-substance carriers in the broadest sense, further subject matter of the invention is constituted by the use of copolycondensates in which X stands for the complexing groups $-NH_2$, $-N(CH_3)_2$, $-N(C_2H_5)_2$, $-NH_2-(CH_2)_2-NH_2$ $$-NH-\overset{\overset{S}{\|}}{C}-NR_2'', \quad -NR''-\overset{\overset{S}{\|}}{C}-NR''_2$$

$-SH$, $-P(C_6H_5)_2$, for removing dissolved metals from a liquid aqueous or organic phase according to the static or dynamic principle.

A further use of all copolycondensates of the invention is their application for the adsorptive binding of gaseous organic solvents. Decisive factors for this absorption capability are in particular the specific pore volume, the pore diameter and the surface properties. These factors can be influenced on the one hand via the production and posttreatment methods of the invention and on the other hand also via the chemical composition, e.g. by means of the insertion of groups of cross-linking agents with hydrophobing action into the polysiloxane skeleton or of suitable functionalities.

The recovery of the adsorbed organic compounds or of the water is readily possible by means of elevating the temperature and/or by gassing with heated air or an inert gas.

DETAILED DESCRIPTION OF THE INVENTION

The invention is explained further in the following in examples of embodiments.

EXAMPLE 1

44.3 g (0.20 mole) $H_2N-(CH_2)_3-Si(OC_2H_5)_3$ and 126.0 g (0.20 mole) $N[(CH_2)_3Si(OC_2H_5)_3]_3$ were dissolved in a cylindrical 2-liter reactor in 200 ml ethanol. The solution was compounded with 50 ml desalinated water and heated to reflux temperature. The mixture was agitated 20 min. under reflux, then cooled to 65° C. and agitated further at 150 rpms until the start of gelling. 2 min. after the start of gelling, 300 ml octanol-1 were added and after another 2 min, 500 ml desalinated water were added. The mixture was agitated 2 h further at 800 rpms, then cooled off and transferred into a 2-liter autoclave. The suspension was agitated 24 h at 130° C. in the autoclave. After another cooling off and filtering off of the formed solid from the liquid phase, a washing with 600 ml ethanol was performed. After 6 hours of drying at 90° C., 4 hours of drying at 110° C. and 12 hours of drying at 130° C. under an atmosphere of $N_2$, 80.2 g polymeric spherical product were obtained consisting of polymer units of the formula $$H_2N-(CH_2)_3-SiO_{3/2}\cdot N[(CH_2)_3SiO_{3/2}]_3,$$

wherein 95% exhibited a particle size of 0.2 to 1.4 mm.
Specific surface: 668 $m^2/g$
Total pore volume: 1.99 ml/g.

EXAMPLE 2

22.2 g (0.1 mole) $H_2N-(CH_2)_2-NH-(CH_2)_3Si(OCH_3)_3$ and 251.9 g (0.5 mole) of $N[(CH_2)_3Si(OCH_3)_3]_3$ were dissolved in 300 ml methanol. The solution was heated to reflux temperature, then compounded with 80 ml desalinated water and agitated another 10 min. under reflux. Thereafter, it was cooled to 50° C. and agitated further at 200 rpms until the start of gelling. 2 min. after the start of gelling, 400 ml hexanol-1 and 3 min. later 400 ml desalinated water in which 1 g polyvinyl acetate had been previously dissolved were added. The mixture was reheated to reflux temperature and agitated 2 h further at 700 rpms. It was cooled off, the formed solid filtered off from the liquid phase and dried 6 h at 100° C., 6 h at 130° C., 12 h at 150° C. and tempered 24 h at 180° C. 159.0 g polymeric, spherical product were obtained consisting of polymer units of the formula $$0.2H_2N-(CH_2)_2-NH-(CH_2)_3SiO_{3/2}\cdot N[(CH_2)_3SiO_{3/2}]_3.$$

After a classification of particle size had been carried out, it turned out that 98% of the product was present in a particle size of 0.1 to 1.4 mm.
Specific surface: 602 $m^2/g$
Specific pore volume: 2.72 ml/g
Bulk density: 310 g/l

EXAMPLE 3

307.5 g (1.0 mole) $H_2N-(CH_2)_2-NH-(CH_2)_2-NH-(CH_2)_3-Si(OC_2H_5)_3$, 126 g (0.2 mole) $N[(CH_2)_3Si(OC_2H_5)_3]_3$ and 208.3 g (1.0 mole) $Si(OC_2H_5)_4$ were combined in a cylindrical 4-liter glass container with double jacket, reflux condenser and propeller condenser. The mixture was compounded with 10 ml desalinated water and agitated 1 h at first at 80° C. at 500 rpms. Then, 800 ml ethanol and another 200 ml water were added. The solution was agitated another 10 min. under reflux, then cooled down to 70° C. and agitated further at 200 rpms until the start of gelling. Immediately after the start of gelling, 1200 ml decanol were added to the developing gel and after another 5 min. 1200 ml water were added. The 2-phase system was subsequently heated to reflux temperature and agitated at 600 rpms another 3 h under reflux. Subsequently, the suspension formed was cooled off, the liquid phase removed by suction via an introduced immersion stem dip pipe and the remaining solid washed 3 times with 2 l ethanol per time. After 6 hours of drying at 90° C., 6 hours of drying at 100° C. and 12 hours of drying at 130° C. under an atmosphere of $N_2$, 314.2 g polymeric product were obtained present in the form of spheres with a particle size $d_{98\%}$ of 0.05 to 1.4 mm and consisting of polymer units of the formula $$H_2N-(CH_2)_2-NH-(CH_2)_2-NH(CH_2)_3SiO_{3/2}\cdot 0.2N[(CH_2)_3SiO_{3/2}]_3\cdot SiO_2$$

Specific surface: 540 $m^2/g$
Specific pore volume: 3.45 ml/g of which 1.74 ml/g as mesopores with a diameter of 20 Å to 300 Å. 1.71 ml/g stemmed from macropores with a diameter greater than 300 Å.
Bulk density (0.3–1.4 mm): 266 g/l

EXAMPLE 4

240.8 g (1.0 mole) $Cl-(CH_2)_3Si(OC_2H_5)_3$, 264.4 g (1.0 mole) $Si(OC_3H_7)_4$ and 100 ml isopropanol were combined in a cylindrical 6-liter glass container with double jacket, KPG agitator and reflux condenser. After the addition of 5 ml 0.1 n aqueous solution of HCl, the mixture was heated to reflux temperature and agitated 5 h at first under reflux. Subsequently, 189.0 g (0.3 mole) $N[(CH_2)_3Si(OC_2H_5)_3]_3$ and 148.3 g (1.0 mole) $(CH_3)_2Si(OC_2H_5)_2$ as well as another 600 ml isopropanol and 200 ml water were added. After 5 minutes of refluxing the entire mixture, it was cooled down to 60° C. and agitated further at 200 rpms until the start of gelling. Immediately after the start of gelling, 1100 ml xylene (industrial isomeric mixture) were added and after another 5 min. 1300 ml water in which 4 g Moviol ® 4-98 had been dissolved were added. After the agitation had been adjusted to 500 rpms, the mixture was reheated to reflux temperature and agitated 1 h further. After cooling off the suspension, filtering off of the solid and 6 hours of drying at 100° C. as well as 12 hours of drying at 150° C., 344 g formed polymeric product were obtained consisting of polymer units of the formula $$Cl-(CH_2)_3-SiO_{3/2}\cdot 0.3N[(CH_2)_3SiO_{3/2}]_3\cdot (CH_3)_2SiO_{2/2}\cdot SiO_2.$$

98% of the spherical solid exhibited a particles size of 0.05 to 2.4 mm.
Specific surface: 172 $m^2/g$
Total pore volume: 0.8 ml/g (totally of micropores)
Bulk density: 603 g/l

EXAMPLE 5

100.8 g (0.2 mole) $N[(CH_2)_3Si(OCH_3)_3]_3$ were compounded with 5 ml desalinated water and agitated 1 h at 60° C. Parallel thereto, 39.9 g (0.2 mole) of the mercapto-functional silane $HS-(CH_2)_3-Si(OCH_3)_3$ were compounded with 2 ml water and likewise agitated 1 h at 60° C. After passage of this time, the two precondensates were combined together with 200 ml methanol and compounded in a cylindrical 2-liter glass container with double jacket, agitator and reflux condenser with another 30 ml water, agitated another 10 min. under reflux, then cooled down to 40° C. and agitated further at this temperature at 150 rpms until the start of gelling. 1 min. after the start of gelling, 230 ml octanol were added and after completion of the homogenization 300 ml water were added. The reaction mixture was reheated to reflux temperature, whereby the agitation had previously been adjusted to 800 rpms. Subsequently, the mixture was agitated 6 h under reflux, then cooled off, the formed solid filtered off from the liquid phase and extracted with 2 liters ethanol.

After a drying analogous to that in example 3, 83.1 g of a block copolycondensate present in spherical form and consisting of units of the formula N[(CH$_2$)$_3$SiO$_{3/2}$].HS—(CH$_2$)$_3$—SiO$_{3/2}$ were obtained.
Particles size range (99%):0.03–1.6 mm
Specific surface: 672 m$^2$/g
Bulk density: 348 g/l

EXAMPLE 6

69.7 g (0.20 mole) (C$_6$H$_5$)$_2$P—(CH$_2$)$_3$—Si(OCH$_3$)$_3$ and 100.8 g (0.20 mole) N[(CH$_2$)$_3$Si(OCH$_3$)$_3$]$_3$ were reacted in 200 ml ethanol analogously to example 1. After the 2-hour reflux phase, the formed octanol-moist product was compounded with 200 ml 5% aqueous solution of ammonia and transferred into an autoclave. The suspension was heated 48 h to 150° C., then cooled off and treated further analogously to example 1. 112.6 g of a formed copolycondensate were obtained consisting of units of the formula N[(CH$_2$)$_3$SiO$_{3/2}$]$_3$.(CH$_6$H$_5$)$_2$P—(CH$_2$)$_3$—SiO$_{3/2}$.

98% of the formed product was present in a particles size of 0.1 to 1.8 mm.
Specific surface: 546 m$^2$/g
Pore volume: 3.2 ml

EXAMPLE 7

71.4 g (0.1 mole) N[(CH$_2$)$_8$Si(OCH$_3$)$_3$]$_3$, 29.8 g (0.1 mole) (H$_3$CO)$_3$Si—(CH$_2$)$_3$—NH—CS—N(C$_2$H$_5$)$_2$ and 20.8 g (0.1 mole) Si(OC$_2$H$_5$)$_4$ were combined in 100 ml ethanol. The mixture was compounded with 30 ml 2% solution of NH$_3$, heated to reflux temperature and agitated under reflux until the start of gelling. Immediately after the start of gelling, 200 ml 2-ethylhexanol and one half minute later 200 ml H$_2$O were added. After the method proceeded further analogously to example 6, 77.0 g polymeric, formed product were obtained consisting of polymer units of the formula N[(CH$_2$)$_8$SiO$_{3/2}$]$_3$.(C$_2$H$_5$)$_2$N—CS—NH—(CH$_2$)$_3$Si-O$_{3/2}$.SiO$_2$.

Particles size distribution (98%): 0.1 to 2.6 mm
Specific surface: <1 m$^2$/g
Bulk density: 648 g/l

EXAMPLE 8

Starting with 100.8 g (0.2 mole) N[(CH$_2$)$_3$Si(OCH$_3$)$_3$]$_3$ and 44.5 g (0.2 mole) (H$_3$CO)$_3$Si—CH$_2$—NH—CO—N(CH$_3$)$_2$, 88.1 g polymeric product was obtained analogously to example 1 using diisopropylether instead of octanol, which product consisted of polymer units of the formula N[(CH$_2$)$_3$SiO$_{3/2}$]$_3$.(CH$_3$)$_2$N—CO—NH—CH$_2$—Si-O$_{3/2}$.

Particles size distribution (98%): 0.1 to 3.0 mm
Specific surface: 762 m$^2$/g
Pore volume: 4.3 ml/g

EXAMPLE 9

Starting with 139.5 g (0.22 mole) N[(CH$_2$)$_3$Si(OC$_2$H$_5$)$_3$]$_3$, 84.8 g (0.22 mole)

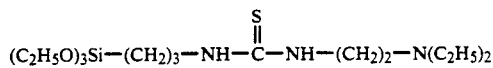

and 46.1 g (0.22 mole) Si(OC$_2$H$_5$)$_4$, 136.0 g of a formed copolycondensate were obtained analogously to example 3 using octane instead of decanol and after a 24-hour posttreatment in 2% solution of NH$_3$ at 150° C. which copolycondensate consisted of polymer units of the formula

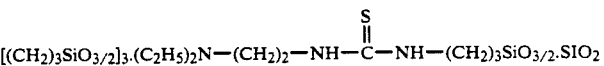

Particles size distribution: 0.2 to 2.8 mm
Specific surface: 532 m$^2$/g
Specific pore volume: 1.4 ml/g
Bulk density: 491 g/l

EXAMPLE 10

54.1 g (0.2 mole) C$_5$H$_5$—(CH$_2$)$_3$—Si(OC$_2$H$_5$)$_3$ (cyclopentadienylpropyltriethoxysilane) and 21.2 g (0.1 mole) (C$_2$H$_5$)Ti(OC$_2$H$_5$)$_3$ were precondensed after the addition of 3 ml 0.1 n solution of HCl for 5 h at first at 80° C. Subsequently, 142.8 g (0.2 mole) N[(CH$_2$)$_5$Si(OC$_2$H$_5$)$_3$]$_3$ added and the method of example 3 followed for the further process, wherein di-n-butyl ether was used instead of decanol. 117.0 g of formed copolycondensate were obtained consisting of polymer units of the formula N[(CH$_2$)$_5$—SiO$_{3/2}$]$_3$.C$_5$H$_5$—(CH$_2$)$_3$—Si-O$_{3/2}$.0.5(C$_2$H$_5$)TiO$_{3/2}$.

Particles size distribution (98%) 0.1 to 2.8 mm
Specific surface: 56 m$^2$/g

EXAMPLE 11

64.4 g (0,1 Mole)

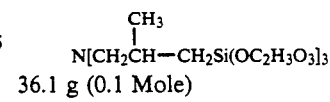

36.1 g (0.1 Mole)

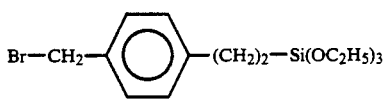

and 7.7 g (0.02 mole) Zr(OC$_4$H$_9$)$_4$ were precondensed analogously to example 10 using 2 ml H$_2$O, where octanol was used instead of di-n-butyl ether. 60.0 g formed copolycondensate were obtained consisting of polymer units of the formula

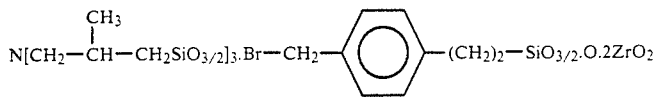

Particles size distribution (96%): 0.2 to 2.2 mm
Specific pore volume: 0.9 ml/g

EXAMPLE 12

63.0 g (0.1 mole) N[(CH$_2$)$_3$Si(OC$_2$H$_5$)$_3$]$_3$, 24.8 g (0.1 mole)

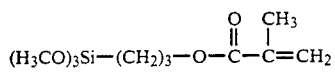

and 2.5 g (0.01 mole) Al(OC$_4$H$_9$)$_3$ were precondensed analogously to example 10 using 2 ml water, where toluene was used instead of di-n-butyl ether. 47.1 g formed copolycondensate were obtained consisting of units of the formula

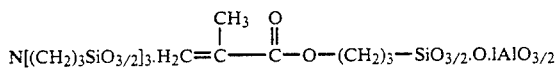

Specific surface: 17 m$^2$/g
Bulk density: 638 g/l

EXAMPLE 13

Starting with 100.8 g (0.2 mole) N[(CH$_2$)$_3$Si(OCH$_3$)$_3$]$_3$ and 40 g (0.2 mole) NC—(CH$_2$)$_3$Si(OCH$_3$)$_3$, 83.5 g of a block copolycondensate present in spherical form were obtained analogously to example 5 consisting of units of the formula N[(CH$_2$)$_3$SiO$_{3/2}$]$_3$.NC—(CH$_2$)$_3$—SiO$_{3/3}$.

Specific surface: 502 m$^2$/g
Bulk density: 370 g/l

EXAMPLE 14

64.8 g (0.1 mole)

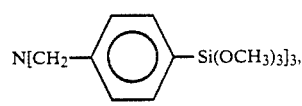

11.1 g (0.05 mole) H$_2$N—(CH$_2$)$_3$—Si(OC$_2$H$_5$)$_3$ and 8.2 g (0.05 mole) C$_3$H$_7$—Si(OCH$_3$)$_3$ were precondensed analogously to example 10 with 1.5 ml H$_2$O, whereby methyl-t-butyl ether was used instead of di-n-butyl ether. 51.2 g formed copolycondensate were obtained consisting of polymer units of the formula

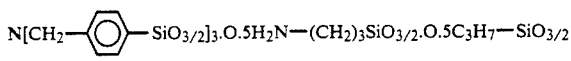

Particles size (98%): 0.1 to 2.4 mm
Specific surface: <1 m$^2$/g
Bulk density: 710 g/l

EXAMPLE 15

A part of the copolycondensate prepared in example 6 with the composition

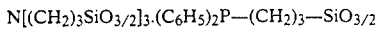

N[(CH$_2$)$_3$SiO$_{3/2}$]$_3$.(C$_6$H$_5$)$_2$P—(CH$_2$)$_3$—SiO$_{3/2}$ with a particles size of 0.3–1.4 mm was slurried in water. 25 ml was taken from the water-moist material and transferred into a glass column with an inner diameter of 20 mm. The column was subsequently loaded within 1 h with 200 ml water in which 20 mg rhodium were dissolved as rhodium acetate. Subsequently, a rewashing with 50 ml water was carried out. An analysis of the combined liquid phases showed that approximately 93% of the originally added rhodium was bound to the solid.

EXAMPLE 16

A part of the copolycondensate prepared according to example 2 with a sieved particles size of 0.3 to 1.0 mm was stirred into water. 25 ml were taken from the water-moist material and transferred into a glass column with an inner diameter of 20 mm. The column was subsequently loaded within 1 h with 200 ml water (pH in which a total of 50 mg Cu$^{1+}$ were dissolved. The column was rewashed with 50 ml water. An analysis of the two combined aqueous phases yielded a residual Cu$^{1+}$ content of 3 mg.

EXAMPLE 17

25 ml of a copolycondensate prepared according to example 5 with a particles size of 0.3 to 1.0 mm were treated analogously to examples 14,15 with 200 ml of an ethanolic solution in which 2 mg mercury were dissolved as Hg(NO$_3$)$_2$. An analysis performed yielded a residual mercury content of 20 μg.

EXAMPLE 18

10 g of the copolycondensate prepared according to example 9 with a particles size of 0.2 to 0.4 mm were stirred into 300 ml of an acetate aqueous solution in which 50 mg platinum were dissolved as H$_2$PtCl$_6$. The suspension was heated to 100° C. and agitated 3 h at this temperature. The solid was subsequently filtered off and washed with 50 ml water. An analysis performed showed that a total of 1 mg platinum remained in solution.

EXAMPLE 19

5 g of the copolycondensate prepared in example 4 were placed in a wash bottle. The wash bottle was loaded in a drying oven thermostatically and with a air current of 50 l/h to 20° C. which was charged with one tenth of its saturation value with trichlorosilane. The absorbtion of trichloroethane was fixed by means of a regular checking of the increase in weight of the polymer. A weight increase of 24% by weight was determined in the equilibrium state.

EXAMPLE 20

A test analogous to that in example 18 using 5 g of the copolycondensate prepared in example 2 with air saturated to 9/10 with m-xylene yielded a weight increase of 50% by weight.

EXAMPLE 21

A test analogous to example 18 using 5 g of the copolycondensate prepared in example 1 with air saturated with n-hexane to 9/10 yielded a weight increase of 40% by weight.

EXAMPLE 22

A test analogous to example 18 using 20 g of the copolycondensate prepared in example 11 was carried out using a glass column with an inner diameter of 20 mm into which the product had been filled. After the passing through of air (50 l/h) saturated to 1/10 with isopropanol, a weight increase of 36% by weight was determined in the equilibrium state.

Further variations and modifications of the foregoing will be apparent to those skilled in the art and we intended to be encompassed by the claims appended hereto.

We claim:

1. Macroscopically spherically formed organosiloxane copolycondensate, comprising units of the formula

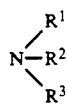  (I)

and units of the formula

X—R$^4$  (II)

wherein R$^1$ to R$^4$ are identical or different and signify a group of the formula

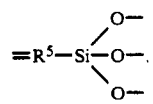  (III)

wherein R$^5$ is bound directly to the nitrogen atom or the single-bonded group and represents a linear or branched alkylene group with 1 to 10 C atoms, a cycloalkylene group with 5 to 8 C atoms or a unit of the formula

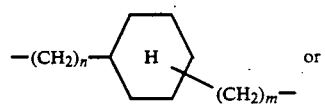 or

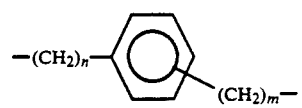

in which n is a number from 1 to 6 and m is a number from 0 to 6, wherein the free valences of the oxygen atoms bound to the silicon atom are saturated as in silica skeletons by silicon atoms of further groups of formula (III), optionally by the metal atoms in one or more of the cross-linking bridge-type cross-links

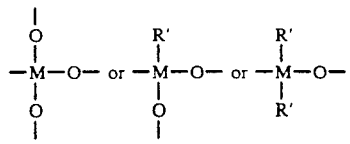

or

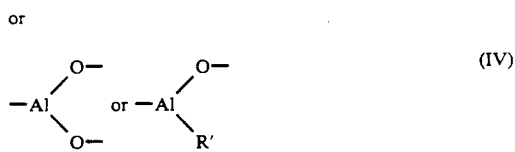  (IV)

wherein M is silicon, titanium or zirconium and R' linear or branched alkyl with 1 to 5 C atoms or phenyl and the ratio of silicon atoms from the groups of the formula (III) to the metal atoms in the bridge-type cross-links (IV) is 1:0 to 1:20 and X in formula (II) stands for —NH$_2$, —N(CH$_3$)$_2$, —N(C$_2$H$_5$)$_2$, —NH—(CH$_2$)$_2$—NH$_2$, —NH—(CH$_2$)$_2$—NH—(CH$_2$)$_2$—NH$_2$, —Cl, —Br, —I, —SH, —P(C$_6$H$_5$)$_2$, —CN,

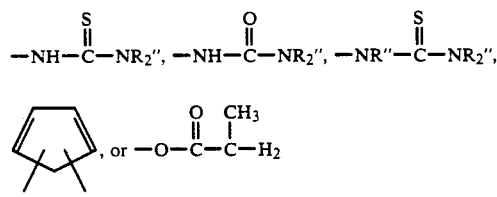

wherein R'' is identical to H or is a linear or branched alkyl group with 1 to 5 C atoms or a group (CH$_2$)$_n$—NR$_2$''', wherein n signifies a number from 1 to 6 and R''' has the same meaning as R''.

2. The macroscopically spherical polycondesates according to claim 1 with a diameter of 0.01 to 3.0, mm, a specific surface up to 1000 m$^2$/g, a specific pore volume of up to 6.0 ml/g as well as a bulk density of 50 to 1000 g/l.

3. The macroscopically spherical polycondensate according to claim 2 with a diameter of 0.1 to 2.0 mm, a specific surface up to 700 m$^2$/g and a bulk density of 800 g/l.

4. The formed organosiloxane copolycondensate according to claim 1, wherein the ratio of units according to formula (I) to units according to formula (III) is from 0.03:99.97 to 99.99:0.01.

5. The copolycondensate according to claim 4 wherein the ratio is 5:95 to 95:5.

6. The formed organosiloxane copolycondensate according to claim 1, present as random copolycondensate, copolycondensate or as a mixed copolycondensates.

7. The formed organosiloxane copolycondensate according to claim 1, wherein R$^1$ to R$^4$ represent a group of the formula

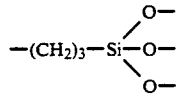

8. A method for the preparation of a formed, random organosiloxane amine copolycondensate comprising:

(a) dissolving together a tertiary aminoorganosilane of the formula

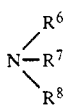 (V)

and organofunctional silane

 (VI)

corresponding to the desired stoichiometric composition of the copolycondensate to be prepared, wherein $R^6$ to $R^9$ are identical or different and signify a group of the formula

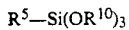 (VII)

$R^5$ has the same meaning as in formula (III) in claim 1, $R^{10}$ signifies a linear or branched alkyl group with 1 to 5 C atoms and X has the same meaning as in formula (II) in claim 1, and, optionally, the addition of one or more cross-linking agents of the formula

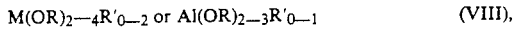 (VIII), wherein M is silicon, titanium, or zirconium, R' a linear or branched alkyl group with 1 to 5 C atoms or a phenyl group and R signifies a linear or branched alkyl group with 1 to 5 C atoms and the ratio of silicon atoms from the groups of the general formula (VII) to the metal atoms in the bridge-type cross links is 1:0 to 1:20, in a solvent which is largely water-miscible but dissolves aminoorganosilanes according to formula (V) and organofunctional silane according to formula (VI) as well as cross-linking agents according to formula (VIII), (b) adding an amount of water to the resulting solution, under agitation, which amount is at least sufficient for the complete hydrolysis and polycondensation reaction mixture, allowing the reaction mixture to gel under further agitation at a certain temperature in a range from room temperature to 200° C., (c) compounding the resulting admixture at the start of gelling or up to one hour thereafter with 10 to 2000% by weight, relative to the total amount of aminoorganosilane (V), organofunctional silane (VI) and the optional cross-linking agents (VIII), of a solvent which is largely water-insoluble but which dissolves the reaction mixture which has gelled or started to gel and homogenizing, (d) adding to 10 to 2000% by weight water, relative to the total amount of aminoorganosilane (V), organofunctional silane (VI) and the optional cross-linking agents (VIII), to the resulting viscous homogenizate immediately or within a time frame of up to 3 hours, optionally under elevation of the originally set temperature;

(e) dispersing the resulting organic phase, which now contains siloxane, in the liquid two-phase system and after a reaction time sufficient for forming a solid in the form of spheres at room temperature to 200° C., separating said solid from said liquid phase, and then optionally extracting, drying at room temperature to 250° C., optionally under protective gas or in a vacuum and tempering 1 to 100 hours at temperatures from 150° C. to 300° C. and optionally classifying said spheres.

9. The method according to claim 8 wherein 50 to 500% water is added in step (d).

10. The method according to claim 8 wherein 50 to 500% solvent is added.

11. The method according to claim 8, characterized in that methanol, ethanol, n- and i-propanol, n- and i-butanol or n-pentanol, alone or in mixture, is used as solvent in the hydrolysis.

12. The method according to claim 8, characterized in that the hydrolysis is carried out with an excess of water.

13. The method according to claim 8, characterized in that a linear or branched alcohol with 4 to 12 C atoms, toluene or o-, m-, p-xylene is added individually or in a mixture to the reaction mixture which has gelled or started to gel.

14. The method according to claim 8, characterized in that a part or also the entire amount of the solvent which is largely water-insoluble and is to be added at or after the start of gelling is added in the hydrolysis stage already in addition to the solvent used in it.

15. The method according to claim 8, characterized in that gelling and forming are carried out at normal pressure or at an excess pressure corresponding to the sum of the partial pressures of the components of the reaction mixture at the particular temperature used.

16. The method according to claim 8, characterized in that the aminoorganosilane according to formula (V) is separately gelled either alone or together with the cross-linking agent (VIII) and/or the organofunctional silane (VI), homogenized with the largely water-insoluble solvent and only then are the components still necessary for the copolycondensate added to the homogenizate.

17. The method according to claim 8, characterized in that in order to obtain formed random copolycondensates, the aminoorganosilane according to formula (V), the organofunctional silane (VI) and the cross-linking agent or agents according to formula (VIII) are precondensed over a period of 5 min. to 48 hours with or without a solvent which dissolves the monomer components, in the presence of an amount of water which is not sufficient for complete hydrolysis, at room temperature up to 200° C.

18. The method according to claim 17, characterized in that the precondensation is carried out in the presence of an acidic, basic or metal-containing condensation catalyst.

19. The method of according to claim 18 wherein the catalyst is ammonia.

20. The method of preparing formed block copolycondensates according to claim 6, wherein a tertiary aminoorganosilane of the formula (V) and an organofunctinal silane of the formula (VI), wherein and optionally one or more cross-linking agents of the formula (VIII) are first precondensed independently of each other over a period of 5 min. to 48 hours optionally using a solvent in the presence of an amount of water which is not sufficient for complete hydrolysis, at room temperature to 200° C. and subsequently combined and then, after the addition of more water and, optionally, more solvent so that at least the amount of water stoichiometrically required for a complete hydrolysis and polycondensation is present, the complete hydrolysis and polycondensation are carried out.

21. The method according to claim 20, characterized in that the precondensation is carried out in the presence of an acidic, basic or metal-containing condensation catalyst.

22. The method of preparing formed, mixed copolycondensates according to claim 8, wherein at least one of the monomeric components provided according to formulas (V), (VI) and (VIII) is precondensed independently of each other for 5 min. to 48 hours optionally using a solvent in the presence of an amount of water which is not sufficient for the complete hydrolysis, at room temperature to 200° C. and is then combined with the non-precondensed monomer or monomers and finally, after the addition of more water and, optionally, more solvent, the complete hydrolysis and polycondensation are carried out.

23. The method of posttreating the formed organosiloxane copolycondensates obtained according to claim 8 but not dried, characterized in that the solid formed in the form of spheres is subjected in the presence of at least the component water in the liquid phase to a temperature of 50° C. to 300° C. for 1 hour to one week, optionally with excess pressure.

24. The method according to claim 23, characterized in that the posttreatment is carried out in the presence of an acidic, basic or metal-containing catalyst.

* * * * *